(12) United States Patent
Boyer

(10) Patent No.: US 6,241,107 B1
(45) Date of Patent: Jun. 5, 2001

(54) MODULAR VENTILATED STORAGE SYSTEM

(76) Inventor: Michael C. Boyer, 36070 Westlund Ave., Taylors Falls, MN (US) 55085

( * ) Notice: Subject to any disclaimer, the term of this patent is extended or adjusted under 35 U.S.C. 154(b) by 0 days.

(21) Appl. No.: 09/161,819

(22) Filed: Sep. 28, 1998

(51) Int. Cl.$^7$ .................................................. A47F 5/14
(52) U.S. Cl. ..................... 211/181.1; 211/106; 403/187
(58) Field of Search ................... 211/181.1, 205, 211/87.01, 90.01, 106, 119, 90.03; 403/109.1, 109.7, 110, 297, 187, 188, 192, 199, 193, 326; 16/422, 426

(56) References Cited

U.S. PATENT DOCUMENTS

| | | | |
|---|---|---|---|
| 1,152,644 | * | 9/1915 | King .............................. 211/181.1 X |
| 2,850,172 | * | 9/1958 | Beckner ........................ 211/181.1 X |
| 2,972,495 | * | 2/1961 | Yalen ............................. 403/297 X |
| 3,007,708 | * | 11/1961 | Ochs .............................. 211/181.1 X |
| 3,162,462 | * | 12/1964 | Elders ............................ 211/181.1 X |
| 3,730,108 | * | 5/1973 | Stroh ............................. 211/181.1 X |
| 3,977,529 | * | 8/1976 | Stroh ............................. 211/181.1 X |
| 4,558,647 | * | 12/1985 | Petersen ........................ 211/181.1 X |
| 4,915,462 | * | 4/1990 | LeMarchand et al. ....... 211/181.1 X |
| 5,178,444 | | 1/1993 | May et al. . |
| 5,251,973 | | 10/1993 | Hazan . |

\* cited by examiner

*Primary Examiner*—Daniel P. Stodola
*Assistant Examiner*—Erica B. Harris
(74) *Attorney, Agent, or Firm*—Hugh D. Jaeger

(57) ABSTRACT

A modular system (1) including a series of parallel dividers (4,5) attached to a back wall grid (80). The dividers (4,5) and grid (80) are formed primarily of 0.25-inch wires welded together in an orthogonal grid pattern having a center to center spacing of approximately three inches. The modular storage system (1) can be mounted on a wheeled base (2) or directly to a wall (50) by brackets. The width of the modular storage system (1) can be increased indefinitely by extender rails (113) which may be added to the basic top rail (10) and bottom rail (47). Rails may be affixed together in the field by a wedge tube fastener (142). The fastener (142) is formed of a horizontal member (143) welded to two vertical, cantilevered metal strips (145, 146). A bolt (148) extends through the horizontal member (143) and into the interior region (147) formed between the two strips (145, 146). The threaded end of the bolt (148) is attached to a threaded base plate (153) that is affixed to a spreader (154) which presses against the metal strips (145, 146). As the bolt (148) is tightened, the spreader (154) causes the two metal strips (145, 146) to separate.

9 Claims, 18 Drawing Sheets

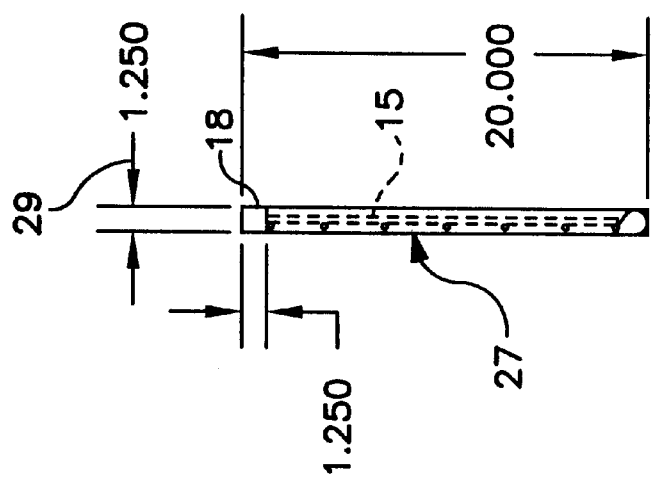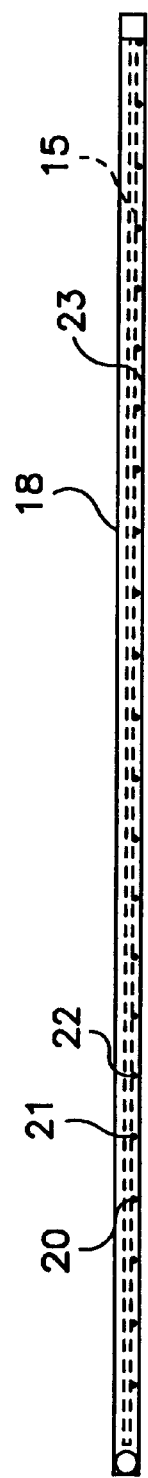

DRILL 3/8" HOLE AND PLUG WELD INTO 1 1/4" DIA TUBE.

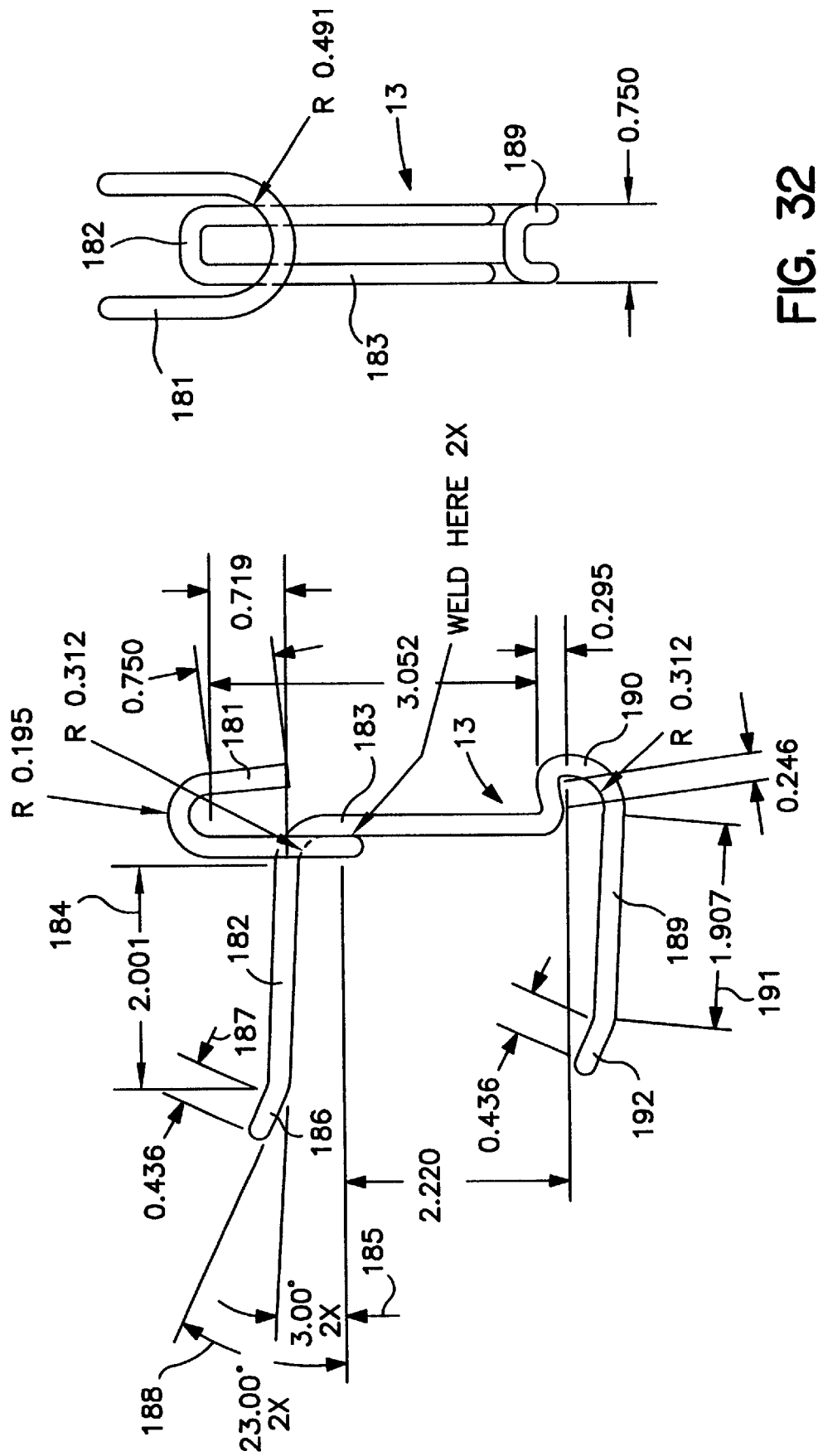

MODULAR VENTILATED STORAGE SYSTEM

CROSS REFERENCES TO CO-PENDING APPLICATIONS

None.

BACKGROUND OF THE INVENTION

1. Field of the Invention

The present invention relates generally to the field of article handling devices, and more specifically to a device that permits secure storage of articles which require ventilation and visibility during storage.

2. Background of the Invention

Many activities require that special clothing be worn by the person engaged in the activity. Many such activities require that the special clothing be worn for relatively brief time periods, such as during participation in a sport, firefighting or utility repair work. This type of "turnout" clothing is typically worn during strenuous physical activity in outdoor environments, resulting in clothing that is often soiled and damp after use. Cleaning and drying of such clothing after each use is often impractical since the clothing must either be kept available for emergency use or is so bulky or complex that cleaning is a time consuming and expensive process.

Such clothing and accessories are best stored at the workplace, and when used, the wearer's normal attire must then be stored, usually in the same place or container as the work clothes. The traditional solution to this problem is the installation of some sort of locker or closet.

In order to provide security, lockers are constructed with solid walls and doors, with a number of vents, holes or slits in the door to provide ventilation. Lockers are typically constructed so as to abut or share a common wall with an adjacent locker, resulting in a row or bank of lockers lining a wall in a gymnasium or fire station. While such an arrangement provides a relatively high level of security, ventilation is poor and the contents of each locker are concealed from view, thereby preventing a rapid method of taking inventory. Labels are also required for each locker in order to identify its contents or its owner. Due to the use of solid walls, doors and floors, the interior of the locker is usually not well illuminated and is difficult to keep clean, especially due to the accumulation of debris on the floor of the locker.

The traditional locker is constructed as a solid rectangle of nonadjustable dimensions, with each adjacent locker having identical dimensions. In order to change locker dimensions, some lockers in the bank must be removed and a new, custom made locker must be substituted in their place. The difficulty and expense of such an operation results in its seldom being performed even when needed. Instead, items are forced into an undersized locker or some required materials are stored in different locations. For example, the clothing needed by a pipeline repair person may be stored in a locker, but needed tools, footwear or headgear may be stored in a separate room since they will not fit in a locker designed only for clothing. This arrangement requires the repair person to go to different locations and consume additional time in order to properly prepare for work.

Ideally, the dimensions of a clothing and accessory storage system would be readily adjustable to accommodate different items in adjacent lockers. The stored articles would be visible without the need to open a door or provide additional illumination. The stored articles would be well ventilated to promote drying and reduce odor; and cleaning of the interior of the storage system would be easily accomplished, or better yet, not even be required. An ideal storage system would be strong in order to provide the required security, but lightweight enough to permit easy installation and relocation. Finally, installation and modification of an improved storage system should be relatively simple as well as adaptable to existing locations rather than requiring the designer of a building to specifically plan for the installation of a prefabricated array of lockers in a dedicated space.

SUMMARY OF THE INVENTION

The present invention is an article storage system that addresses many of the shortcomings of prior art devices. The present invention is designed primarily for storing special use turnout gear, and includes a modular, adjustable framework which may be mounted either on a vertical wall surface or on a wheeled, movable base. The walls are formed primarily of an open wire mesh supported by a tubular framework. An underlying support structure may be mounted to a vertical wall, thereby permitting the tubular framework to be mounted at various positions along the wall and forming an enclosed region. The width of the enclosed region may be varied by selecting different rails which form the underlying support structure. Adjacent enclosed regions may have different widths.

The floor and ceiling of the enclosed storage region may be spaced apart from the adjacent interior of the room, thereby permitting airflow through the entire storage system even when the sidewalls abut adjacent structure or walls. Cleaning of the area beneath the storage region is simplified, and articles may be placed within the interior storage region while still damp. The interior of the storage region can accommodate various custom hangers and shelves adapted to support specialized garments and accessories. A secure storage box may also be mounted within the interior storage region for protecting and concealing valuables. A lockable door, also constructed of an open wire mesh, may be affixed to the tubular framework to create a completely enclosed and secure container while still permitting illumination and viewing of the contents of the interior storage region.

The various components of the present invention are fastened together using a combination of conventional hardware and a novel wedge fastener. The wedge fastener fits within portions of the underlying support structure. Adjacent portions of the underlying support structure may thereby be fastened together without the need for drilling or preassembly alignment. Further, the top and bottom rails which form the underlying support structure may be selected at the installation site to accurately fit the available wall space or to permit adjustment of the dimensions of the interior storage regions. The entire system may be assembled without the use of power tools.

The support structure may be mounted on a movable base formed to include castering wheels, or it may be mounted on brackets permanently affixed to a wall. The use of brackets permits the entire storage assembly to be easily removed whenever necessary. This feature of the present invention allows the room to be painted, utility panels to be accessed, and oversized equipment to be moved through the room without delay.

In a preferred embodiment, the present invention is constructed of a strong rigid material, such as steel. The open wire grids are formed of cold rolled steel wire, but any material may be used which would supply the strength and durability needed for the particular articles to be stored. For example, a storage system placed in an environment which is constantly under surveillance may perform less of a security function and be primarily used to organize needed items. Similarly, the wire grid spacing may be varied depending on the articles to be stored and the environment in which the storage system will be placed.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 7 illustrates a side elevation view of the divider depicted in FIG. 6;

FIG. 8 illustrates a top plan view of the divider depicted in FIG. 6;

FIG. 31 illustrates a side elevation view of the hook depicted in FIG. 5; and,

FIG. 32 illustrates a front elevation view of the hook depicted in FIG. 31.

DETAILED DESCRIPTION OF THE PREFERRED EMBODIMENTS

Figure 1:
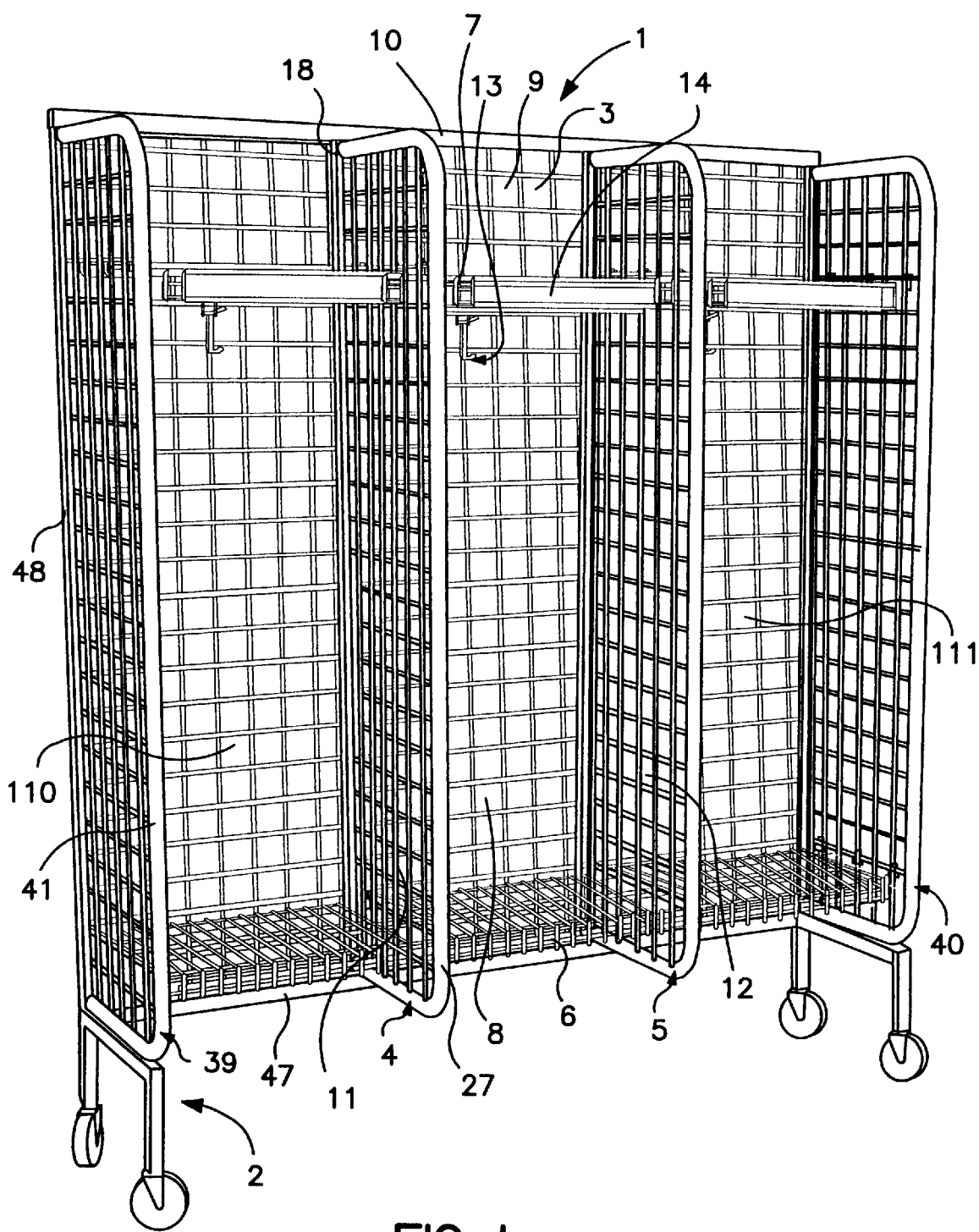
FIG. 1 illustrates a perspective view of a storage system module constructed in accordance with the principles of the present invention.

As seen in FIG. 1, a modular storage system 1 is shown mounted on a wheeled base 2. The major components of the modular storage system 1 include a back wall 3 from which extend dividers 4 and 5. A bottom shelf 6 resides between dividers 4 and 5, as does a top shelf 7. The vertical position of the top shelf 7 and bottom shelf 6 with respect to the adjacent dividers 4 and 5 is adjustable based on the expected heights and types of items to be retained. The dividers 4 and 5 as well as shelves 6 and 7 together define an enclosed storage region 8. An unenclosed storage region 9 exists above top shelf 7, and items placed thereon may extend well above the top rail 10 which supports back wall 3. Similarly, items of various textures and dimensions, such as clothing, may partially extend through the sidewalls defined by dividers 4 and 5 inasmuch as the dividers contain numerous openings, such as openings 11 and 12, for example. Longer items, such as dowels, scales, prybars or similar items can be supported horizontally within the enclosed region 8 by extending through both dividers 4 and 5, or by hanging from hook 13, which is itself secured to back wall 3 or the dividers 4 or 5.

Figure 6:
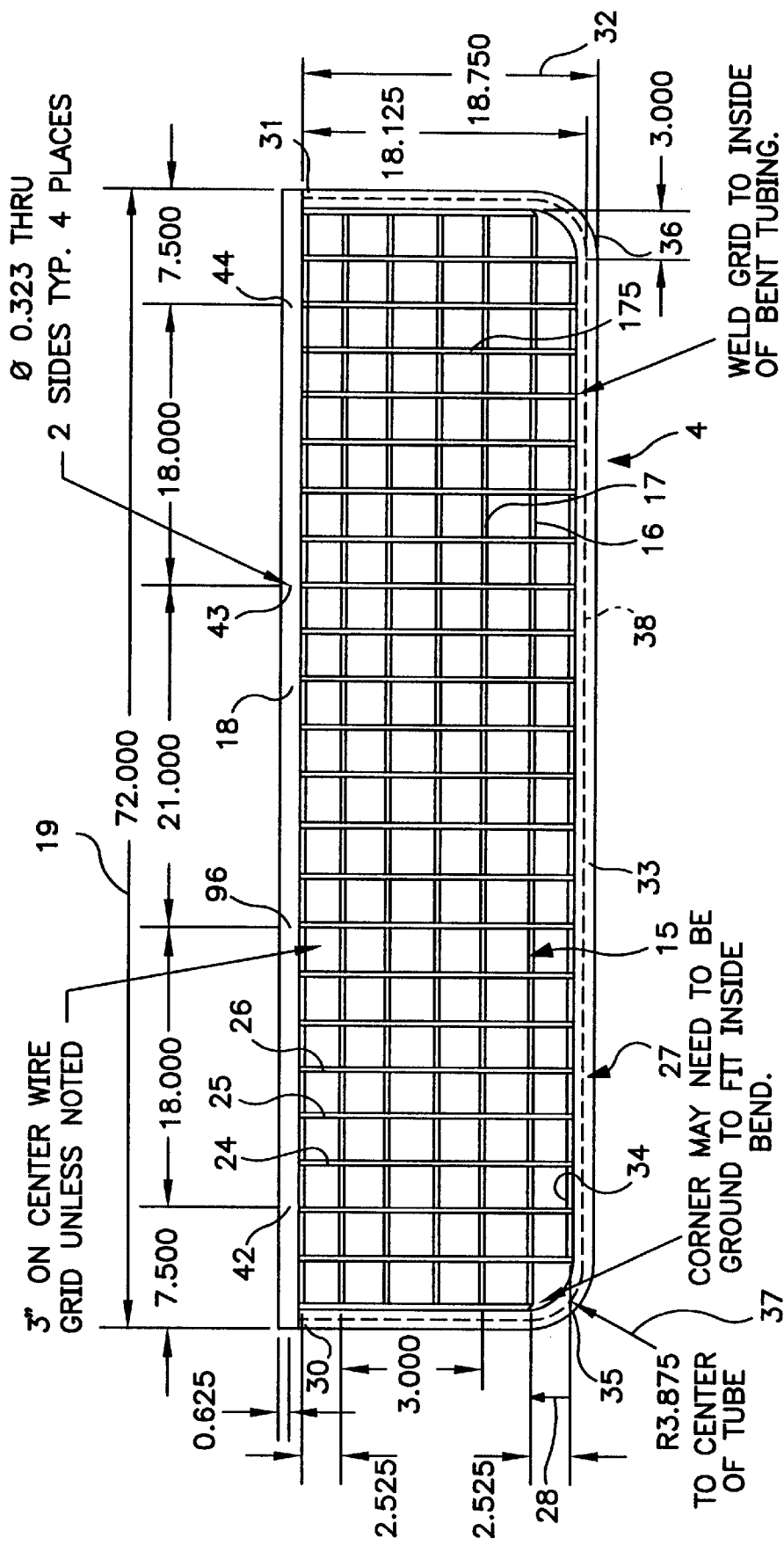
FIG. 6 illustrates a front elevation view of a divider used in the construction of the storage system module depicted in FIG. 3.

A name plate or label 14 may also be fastened to the top shelf 7 if desired. In a preferred embodiment, the name plate 14 is constructed of twenty-gauge cold rolled steel sheet and is formed to accept a two-inch high and sixteen-inch long custom printed tag. Referring also to FIGS. 6, 7 and 8, each divider, such as divider 4, is constructed primarily of a wire mesh grid 15. Each wire, such as wire 16, for example, is preferably a high strength cold rolled steel wire having a nominal outside diameter of 0.25 inch. The nominal center to center spacing 28 between adjacent parallel wires 16 and 17, for example, is three inches. The rear support member 18 of divider 4 is formed of sixteen-gauge square steel tubing having a nominal cross sectional width 29 of 1.25 inches.

In a preferred embodiment, the rear support member 18 has a length 19 of seventy two inches but can of course be made any convenient length. A series of holes 20, 21 and 22, for example, are drilled into the sidewall 23 of the rear support member 18, each hole being slightly larger than 0.25 inch in diameter and being spaced from each adjacent hole by a center to center distance of three inches, thereby accommodating a porting of the wires 24, 25 and 26, for example. The wire 24 can be secured within the hole 20 by spot welding, an adhesive, crimping, or not fastened at all, inasmuch as the dimensions and position of the hole 20 itself act to constrain movement of the grid 15. The grid 15 is further secured by bent divider perimeter tube 27 which is preferably formed of sixteen-gauge round steel tubing having a nominal diameter of 1.25 inches.

The ends 30 and 31 of the perimeter tube 27 are welded to the rear support member 18 at an approximate ninety degree angle. The perimeter tube 27 extends outwardly from the rear support member 18 for a distance 32 of approximately 18.75 inches. Perimeter tube 27 has a straight portion 33 which is parallel to rear support member 18. A wire 34 of grid 15 abuts the straight portion 33 and is welded thereto, thereby rigidly securing grid 15 within the region bounded by rear support member 18 and perimeter tube 27. The perimeter tube 27 is bent at corners 35 and 36 through a radius 37 of 3.875 inches as measured with respect to the longitudinal axis 38 of the perimeter tube 27.

The divider structure 4 just described is also used to form the end walls 39 and 40 of the modular storage system 1. Optionally, a tubular structure surrounding a wire mesh can be used as a door (not shown) to span the distance between the perimeter tube 27 of the divider 4 and perimeter tube 41 of end wall 39. Holes 42, 43 and 44, of rear support member 18, having diameters of 0.323 inch, serve as fastening points for hinges on the door (not shown) which are also anchored to perimeter tube 41 of end wall 39.

Figure 2:
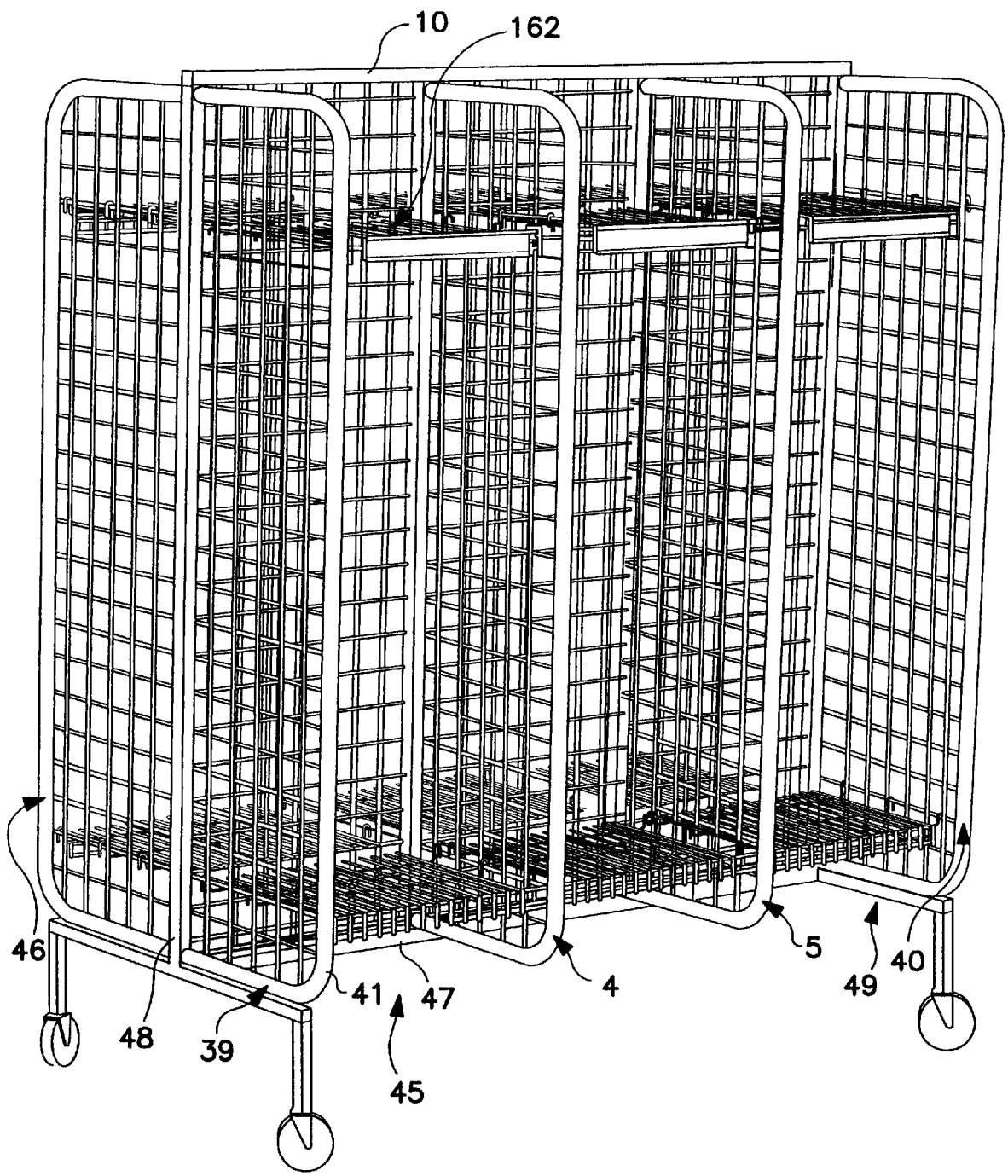
FIG. 2 illustrates a perspective view of a plurality of the storage system modules depicted in FIG. 1 combined to form a single structure.

The basic building blocks just described can be used to create a bank of six lockers, such as lockers 45 depicted in FIG. 2. The top rail 10 is common to the dividers 4 and 5, and the end walls 39 and 40, as well as to the end wall 46, for example, which is opposite end wall 39. Similarly, bottom rail 47 as well as rear support member 48 are each shared by both end walls 39 and 46, for example. All of the dividers and end walls are substantially identical, and the rear support members are welded to the dividers and end walls. A wheeled base 49 is used to support the lockers 45.

Figure 3:
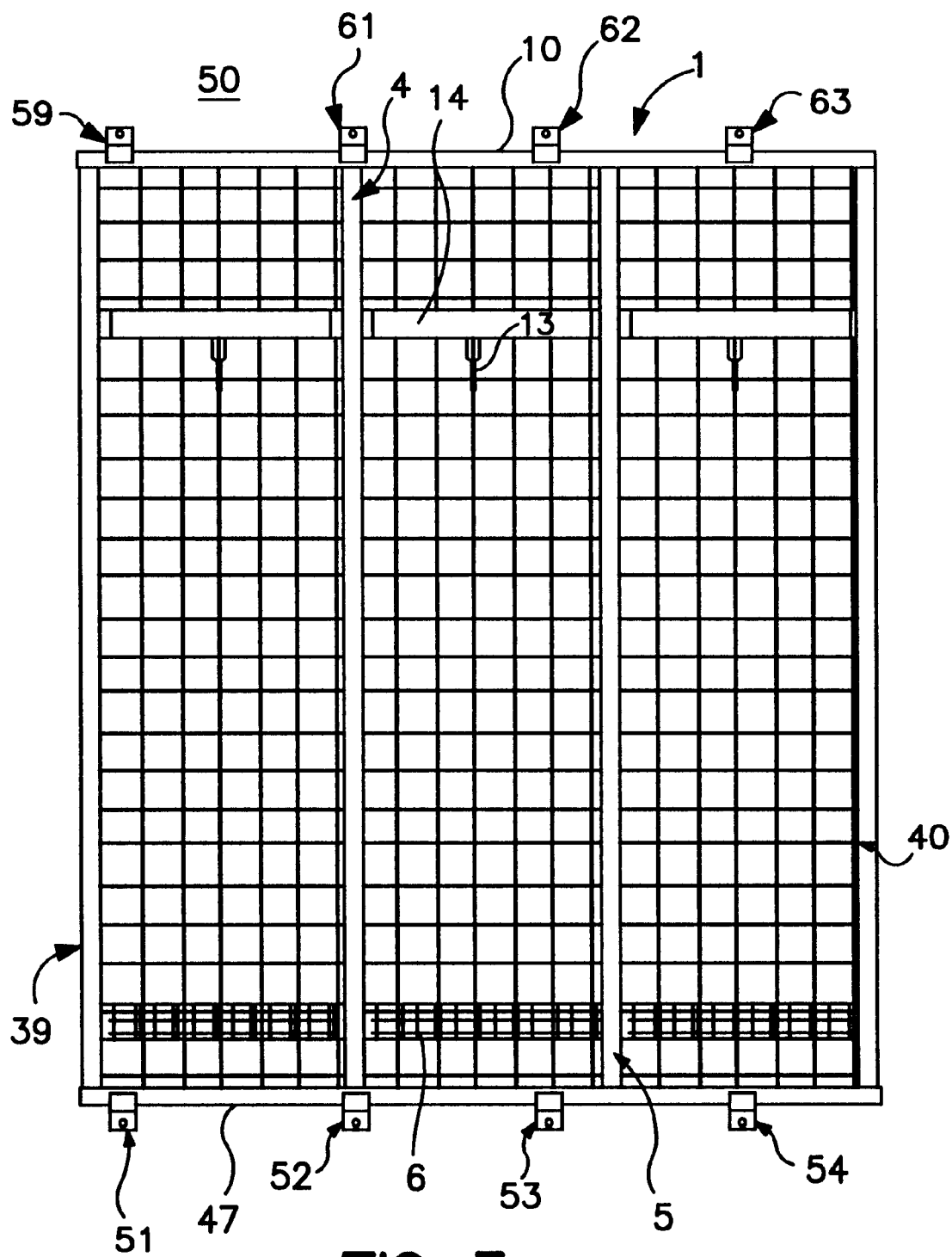
FIG. 3 illustrates a front elevation view of a storage system module mounted on a wall.
Figure 4:
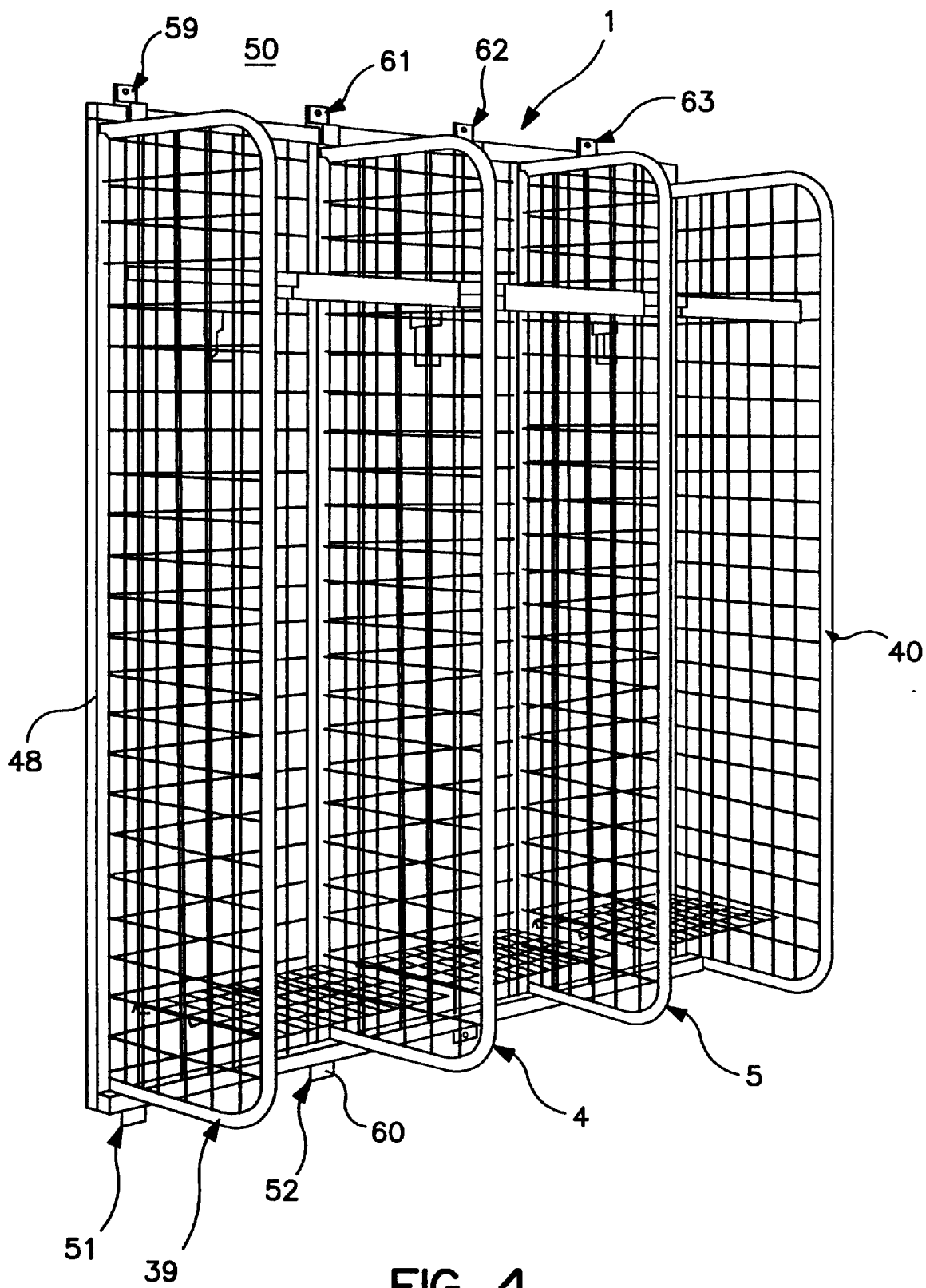
FIG. 4 illustrates a perspective view of the storage system module depicted in FIG. 3.
Figure 29:
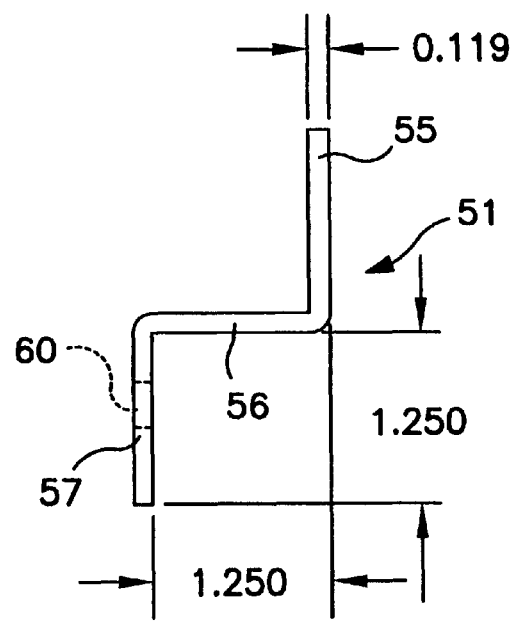
FIG. 29 illustrates a side elevation view of a bracket depicted in FIG. 3.
Figure 30:
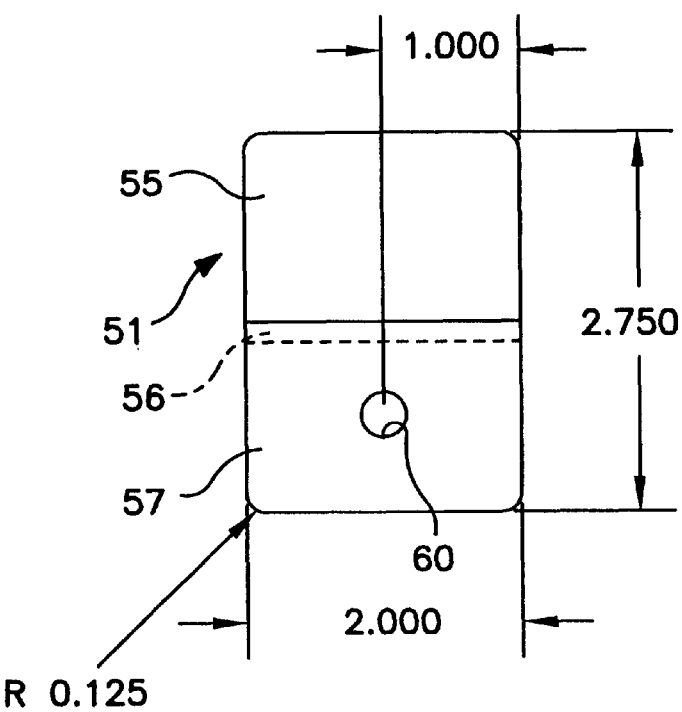
FIG. 30 illustrates a front elevation view of the bracket depicted in FIG. 29.

The modular storage system 1, without the presence of wheeled base 2, may also be mounted on a wall 50, as seen in FIGS. 3 and 4. In the case of wall mounting, a series of bottom brackets 51, 52, 53 and 54 are used to support the bottom rail 47. As more clearly seen in FIGS. 5, 29 and 30, each bottom bracket, such as bracket 51, for example, is formed to include an upper vertical portion 55 and a lower vertical portion 57, the two vertical portions 55 and 57 being joined by horizontal portion 56. The bottom rail 47 is supported on horizontal portion 56 when the modular storage system 1 is mounted on wall 50. As seen on the adjacent bottom bracket 52, a mounting hole 60 is formed within the lower vertical portion 57 to permit a bolt or similar fastener to be affixed to the wall 50. Similarly, a series of top brackets 59, 61, 62 and 63 are used to retain top rail 10 against wall 50. Note that no fastener is used to secure the top brackets 59, 61, etc. to the top rail 10 or the bottom brackets 51, 52, etc. to the bottom rail 47, thereby eliminating the need for any holes to be drilled in the top rail 10 or the bottom rail 47, or for any lateral alignment between the individual brackets 59, 61, etc. and the top rail 10 and between the individual brackets 51, 52, etc. and the bottom rail 47. While the spacing between the individual brackets 59, 61, etc. and 51, 52, etc. is nominally uniform, in practice this need not be the case, thereby permitting the brackets to be mounted so as to avoid any minor obstacle on a wall, such as an imperfection in a cinder block or wall stud. Since neither the top nor the bottom brackets are affixed to the rails 10 and 47, this permits the entire modular storage system 1 to be mounted, adjusted in position or removed without the need to completely remove the various brackets 51, 59, etc. Further, this mounting method permits the entire modular storage system 1 to be affixed to the wall 50 by only one person if necessary.

Figure 5:
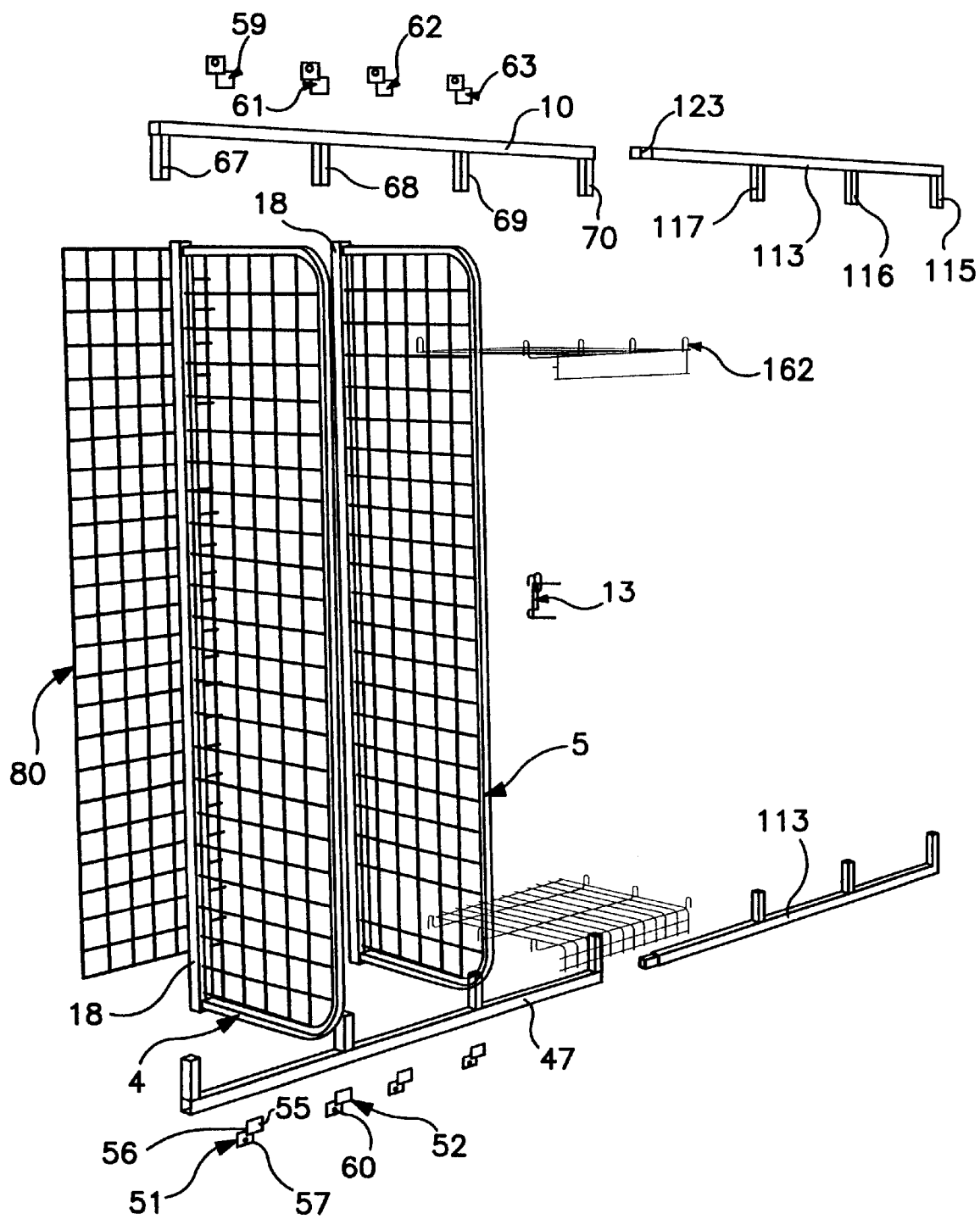
FIG. 5 illustrates an exploded perspective view of the storage system module depicted in FIG. 3, with some components removed for clarity.
Figure 17:
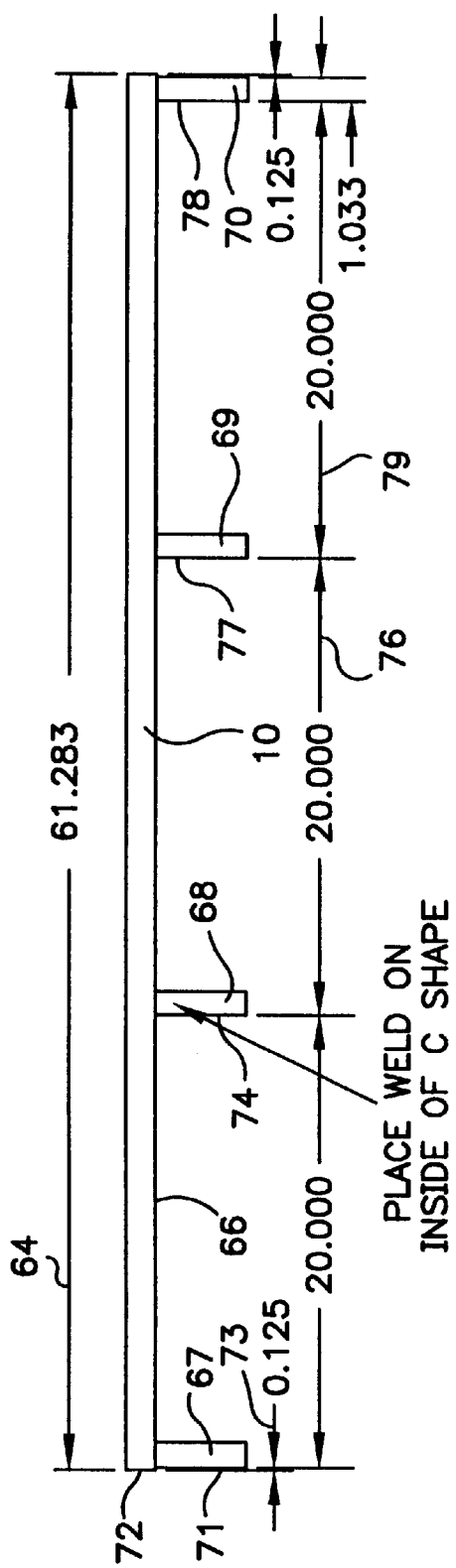
FIG. 17 illustrates a front elevation view of a first embodiment of a top rail used in the construction of the storage system module depicted in FIG. 3.
Figure 18:
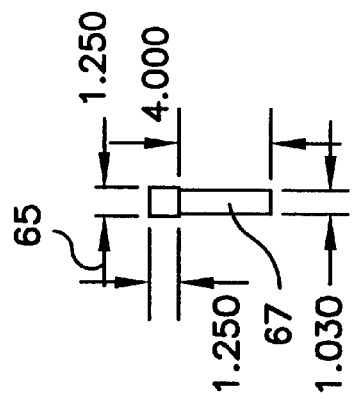
FIG. 18 illustrates a side elevation view of the top rail depicted in FIG. 17.

The particular dimensions of the modular storage system may be conveniently adjusted in several ways. Referring also to FIGS. 17 and 18, the particular construction of the top rail 10 can be seen. As best seen in FIG. 5, the top rail 10 and the bottom rail 47 are substantially identical. The top rail 10 is normally fabricated to have a length 64 of 61.283 inches. The top rail 10 is formed of sixteen-gauge square tubing having a cross sectional width 65 of 1.25 inches. Affixed to the bottom surface 66 of the rail 10 are a series of inserts 67, 68, 69 and 70.

Each insert 67, 68, etc. is formed of fourteen-gauge steel formed into a "C" cross sectional shape. The open side of the "C" is oriented to face toward wall 50 and away from the rear support member 18, for example. For each insert 67, 68, etc., the portion of the "C" most distant from wall 50 is welded to the bottom surface 66. The outer wall 71 of insert 67 is displaced by a distance 73 of 0.125 inch from the end 72 of top rail 10. The outer wall 74 of the adjacent insert 68 is displaced from outer wall 71 by a distance 75 of twenty inches. Similarly, the distance 76 from the outer wall 74 of insert 68 to the outer wall 77 of insert 69 is also twenty inches. The next outer wall 78 of insert 70 is separated from outer wall 77 by a distance 79 of twenty inches.

Figure 9:
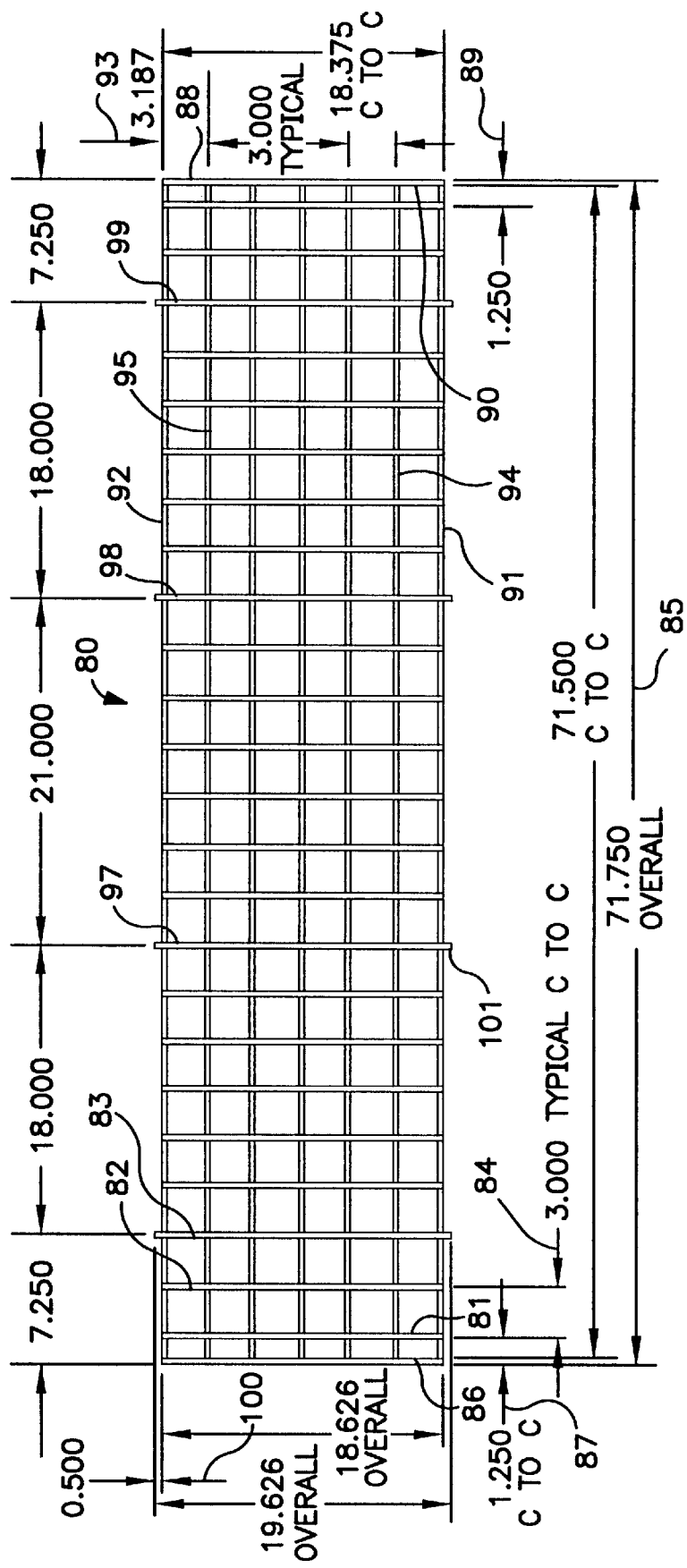
FIG. 9 illustrates a front elevation view of a first embodiment of a back wall grid used in the construction of the storage system module depicted in FIG. 3.

When top rail 10 having the dimensions just described is used, it permits the dividers 4, 5, etc. to be separated from each adjacent divider by a distance of twenty inches. Referring also to FIG. 9, the back wall grid which is used with the top rail 10 is shown generally at 80. The back wall grid 80 is 0.25 inch cold rolled steel wire. The spacing 84 of most of the wires 81, 82 and 83, for example, is three inches center to center.

The overall length 85 of the back wall grid 80 is 71.75 inches. The first end wire 86 is spaced from adjacent wire 81 by a distance 87 of only 1.25 inches. Similarly, the second end wire 88 is spaced a distance 89 from adjacent wire 90 of 1.25 inches. The outer side wires 91 and 92 are spaced apart a distance 93 from the adjacent parallel wires 94 and 95, respectively, of 3.187 inches, center to center. The back wall grid 80 is secured to the adjacent divider 4, for example. A series of holes 42, 96, 43 and 44 (FIG. 6) are formed within the rear support member 18 of divider 4. As earlier discussed, the holes 42, 43, etc. may be used as anchoring points for hinges (not shown) if the divider 4 is to be converted into use as a door.

Figure 19:
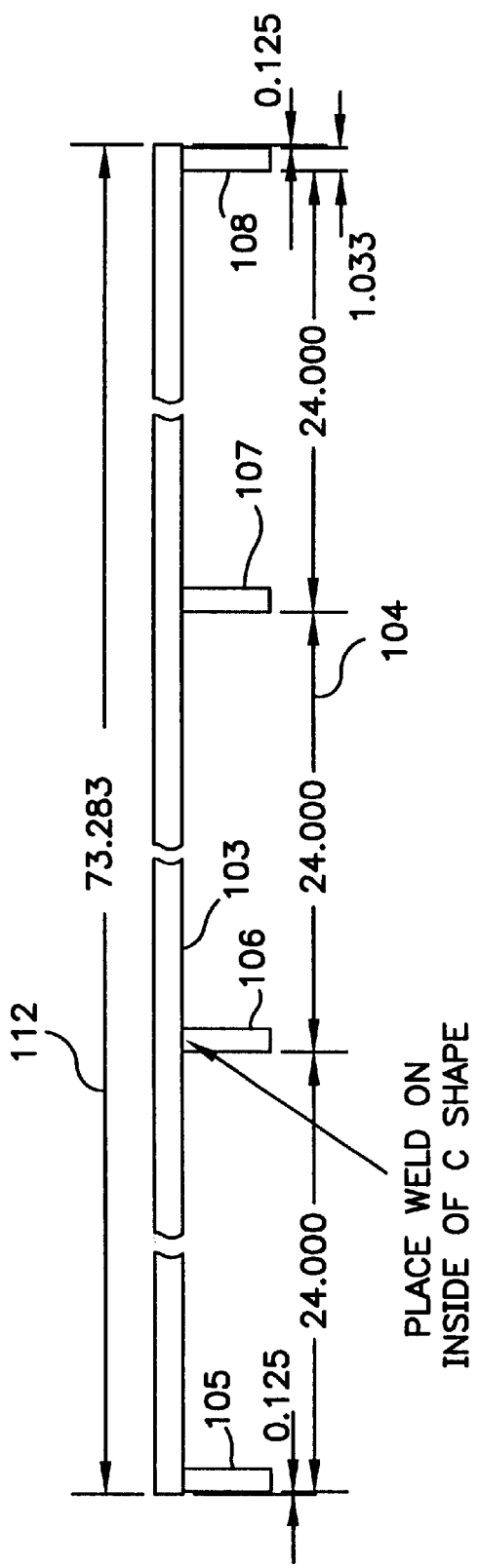
FIG. 19 illustrates a front elevation view of a second embodiment of a top rail used in the construction of the storage system module depicted in FIG. 3.
Figure 20:
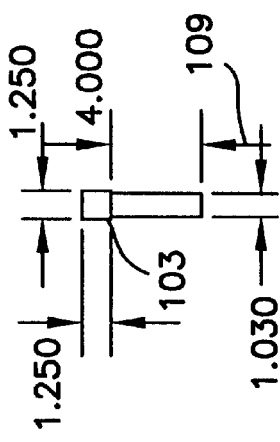
FIG. 20 illustrates a side elevation view of the top rail depicted in FIG. 19.

However, the back wall grid 80 is formed to have selected wires extend beyond the outer side wires 92 and 91. In particular, wires 83, 97, 98 and 99 each protrude a distance 100 of 0.5 inch beyond the outer side wires 91 and 92. Each protruding wire tip fits into and is retained by a hole on the rear support member 18, such as tip 101, for example, of wire 97 which fits into the hole 96 (see FIG. 6) of the rear support member 18. The overall center to center width 102 of the back wall grid 80 is 18.375 inches, making the back wall grid 80 suitable for use with the top rail 10. Referring also to FIGS. 19 and 20, a longer top rail 103 is shown having an overall length 112 of 73.283 inches. The rail 103 permits the spacing between adjacent dividers 4 and 5, for example, to be expanded from twenty inches to a distance 104 equal to twenty-four inches. Top rail 103 is otherwise substantially identical to top rail 10, with each insert 105, 106, 107 and 108 having a length 109 of approximately four inches.

Figure 10:
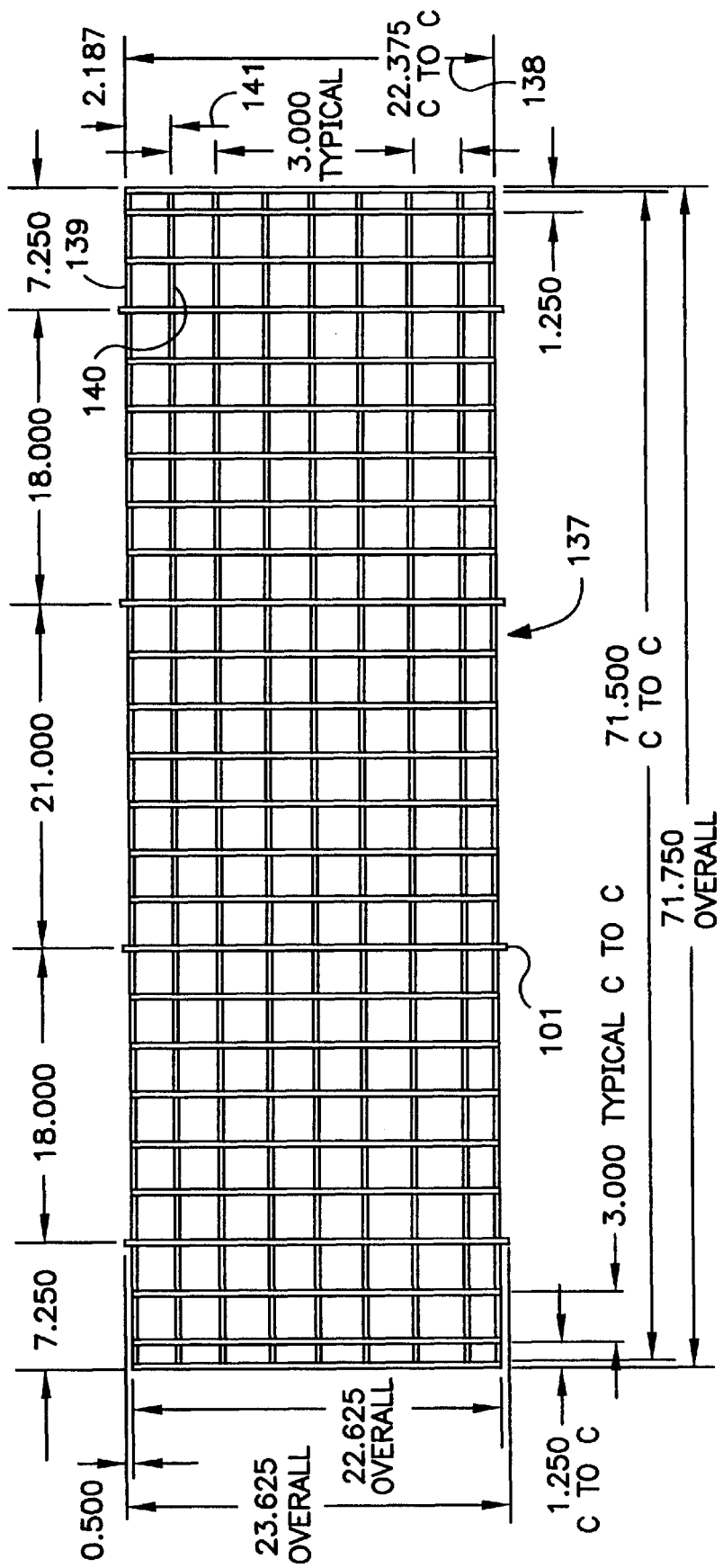
FIG. 10 illustrates a front elevation view of a second embodiment of a back wall grid or rear grid used in the construction of the storage system module depicted in FIG. 3.
Figure 11:
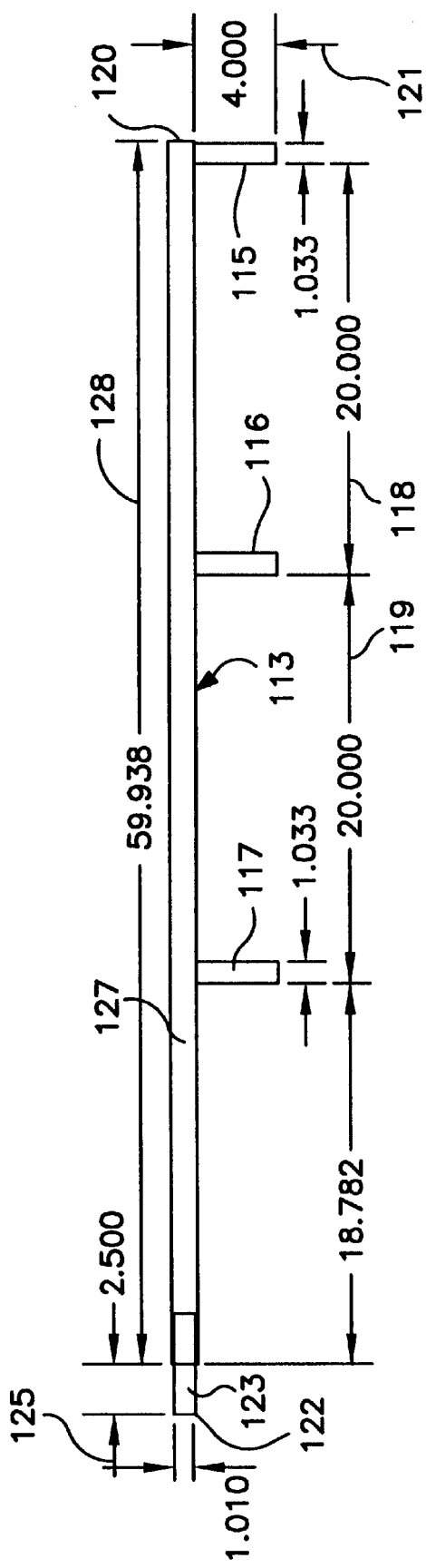
FIG. 11 illustrates a front elevation view of a first embodiment of an extender rail used to construct the storage system module depicted in FIG. 3.
Figure 13:
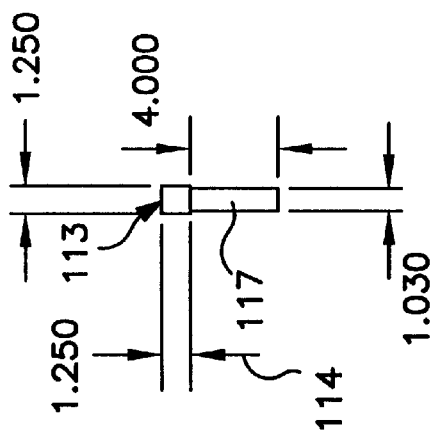
FIG. 13 illustrates a side elevation view of the extender rail depicted in FIG. 11.
Figure 12:
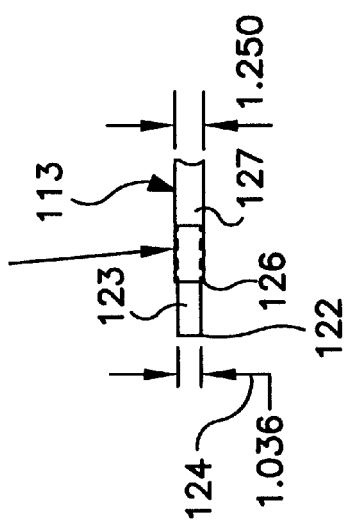
FIG. 12 illustrates a detail view of a portion of the extender rail shown in FIG. 11.

When top rail 103 is used, rear grid 137, seen in FIG. 10, is used instead of back wall grid 80. The dimensions and construction of rear grid 137 are substantially identical to those of back wall grid 80, except that the center to center width 138 is increased to approximately 22.375 inches. This results in the outer wire 139 being spaced apart from the adjacent parallel wire 140 by a distance 141 which is equal to approximately 2.187 inches.

As seen in FIG. 1, the basic modular system 1 consists of three discrete storage regions 110, 8 and 111. When additional width beyond top rail 10 is needed, an extender rail 113 may be employed, as best seen in FIGS. 5, 11, 12 and 13. Most of extender rail 113 is formed of sixteen-gauge square steel tubing 127 having a cross sectional width 114 of 1.25 inches. Three inserts 115, 116 and 117 are sequentially spaced at intervals 118 and 119 of twenty inches each starting from first end 120. Each insert 115–117 has a length 121 of approximately four inches. Extending from the second end 122 toward first end 120 is a tube 123 having an outside diameter 124 of approximately 1.036 inches. The tube 123 extends for a distance 125 of approximately 2.5 inches until reaching the edge 126 of the larger square tubing 127, into which it extends and to which it is rigidly affixed by welding. The tube 123 can be placed within the adjacent top rail 10 to create an integral top rail having a greater overall length. The length 128 of square tubing 127 is approximately 59.938 inches.

Figure 14:
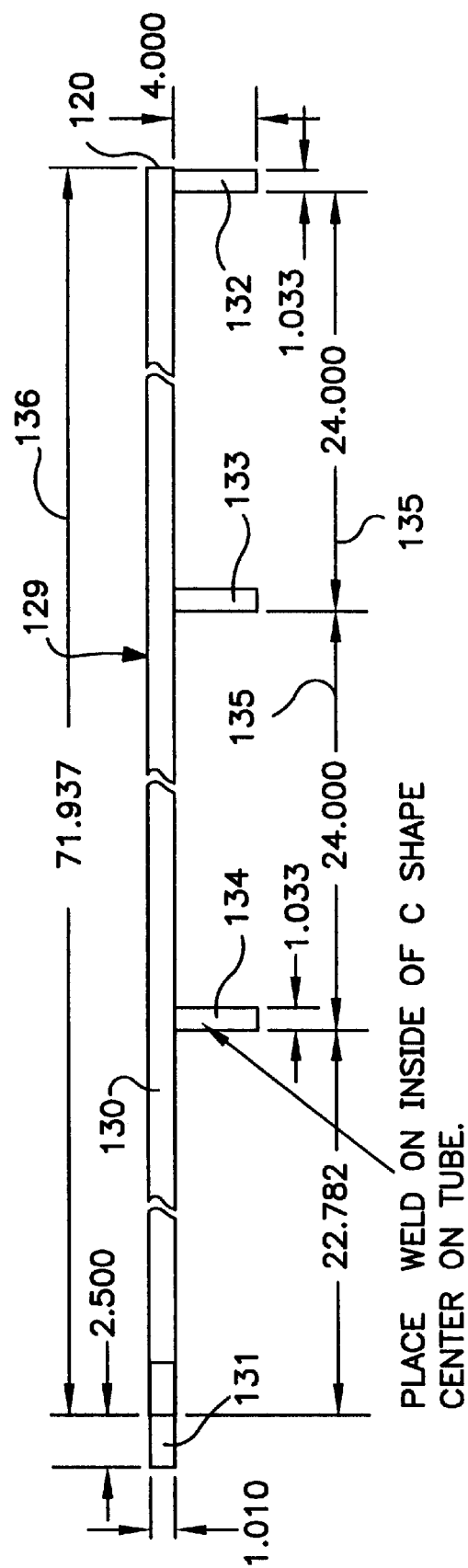
FIG. 14 illustrates a front elevation view of a second embodiment of an extender rail used to construct the storage system module depicted in FIG. 3.
Figure 16:
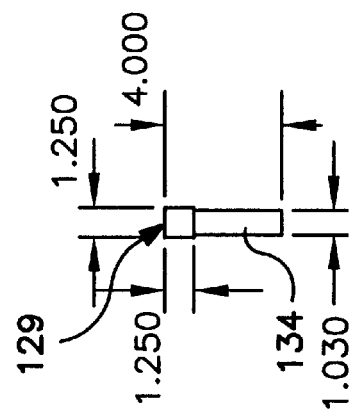
FIG. 16 illustrates a side elevation view of the extender rail depicted in FIG. 14.
Figure 15:
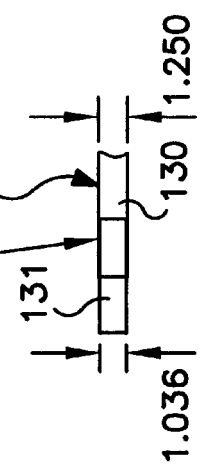
FIG. 15 illustrates a detail view of a portion of the extender rail shown in FIG. 14.

If even greater width of the modular storage system 1 is needed, a longer extender rail 129 can be used, as shown in FIGS. 14, 15 and 16. The manner of construction is substantially identical to that of extender rail 113.

A square tube 130 accommodates a round insert 131 which is welded in place. The only differences between the two extender rails 113 and 129 is that the divider inserts 132, 133 and 134 are spaced apart from each other a distance 135 of approximately twenty-four inches, resulting in an overall length 136 of 71.937 inches. The extender rail 113 is used when the spacing between adjacent dividers 4 and 5, for example, is twenty inches, whereas the extender rail 129 is used for divider spacings of twenty-four inches. In some cases a user may desire to attach multiple extender rails 113 together in a serial fashion. A wedge tube fastener 142 as depicted in FIGS. 21 and 22 may then be used to accomplish such customization of the modular storage system 1.

Figure 21:
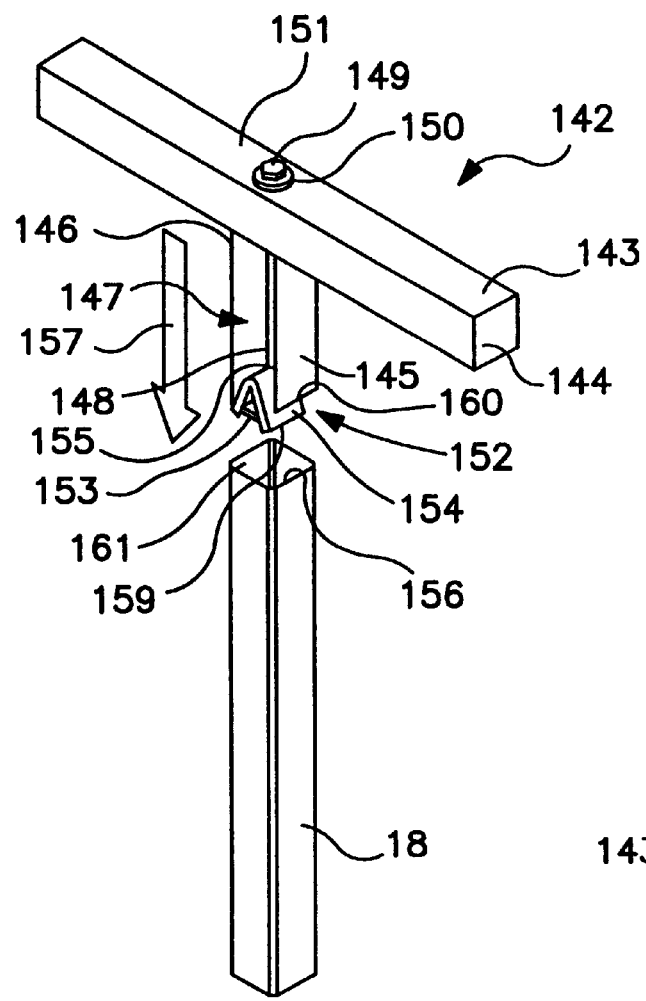
FIG. 21 illustrates a perspective view of a wedge tube fastener which may be used in the construction of the storage system module depicted in FIG. 3, prior to insertion in a frame component.
Figure 22:
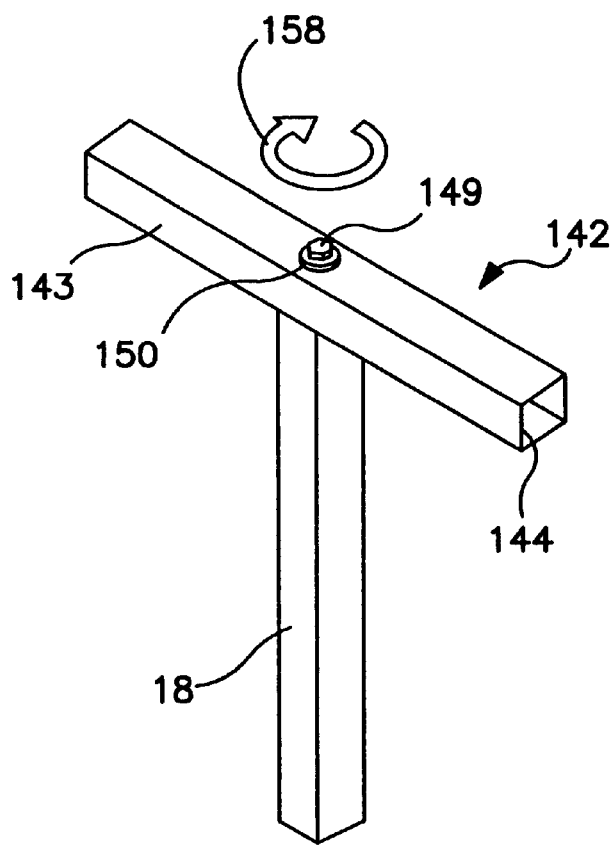
FIG. 22 illustrates a perspective view of the wedge tube fastener depicted in FIG. 21, after insertion in a frame component.
Figure 23:
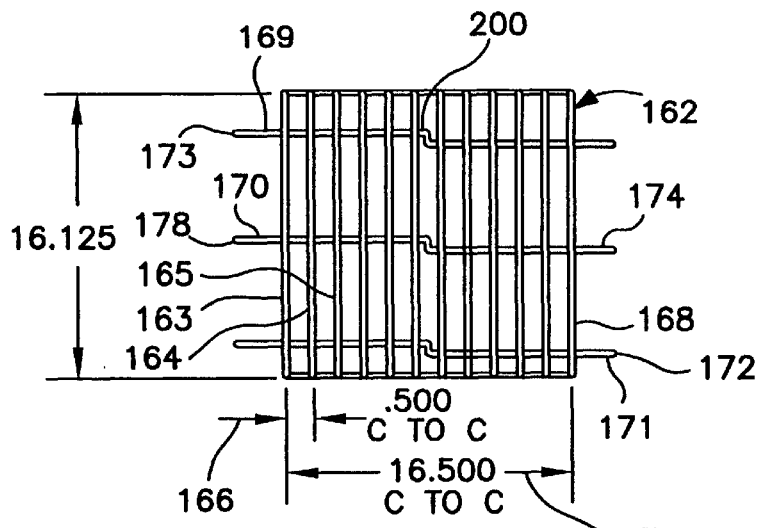
FIG. 23 illustrates a top view of a first embodiment of a shelf as depicted in FIG. 5.
Figure 24:
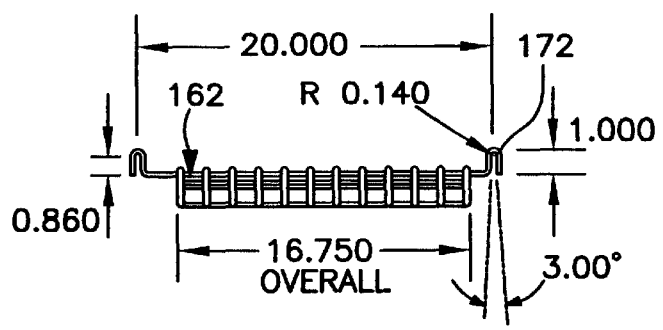
FIG. 24 illustrates a front view of the shelf depicted in FIG. 23.
Figure 25:
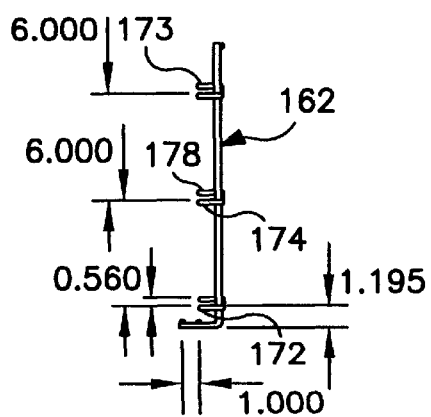
FIG. 25 illustrates a side elevation view of the shelf depicted in FIG. 23.

In FIG. 21, a divider rear support member, such as rear support member 18 is shown, with the remainder of the divider 4 omitted for clarity. The wedge tube fastener 142 is formed to include a horizontal member 143, preferably formed of sixteen-gauge, 1.25 inch square steel tubing. The interior passageway 144 is thus sufficiently large to accept the extension tube 123 of extender rail 113. The wedge tube fastener 142 also includes a first vertical member 145 and a second parallel vertical member 146, which are the opposing sides of a channel which is welded to the horizontal member 143. Within the interior region 147 between parallel vertical members 145 and 146 is a bolt 148 having a head 149. A hole (not visible) formed vertically through the horizontal member 143 accommodates the bolt 148, which is aligned along a path between and parallel to the vertical members 145 and 146. A washer 150 supports head 149 against the upper surface 151 of the horizontal member 143.

Residing between parallel vertical members 145 and 146 is a wedge assembly 152, which is formed to include a threaded base plate 153 and a spreader 154. The bolt 148 passes through hole 155 formed in the spreader 154 and is threaded into a tapped hole (not visible) in the base plate 153. In operation, the wedge assembly 152 is inserted into the hollow channel 156 of the rear support member 18 by moving the fastener 142 in the direction of arrow 157. As best seen in FIG. 22, once the fastener 142 is fully inserted into rear support member 18, the head 149 of right handed bolt 148 is rotated clockwise in the direction of arrow 158. As the bolt 148 is tightened, the lower edges 159 of spreader 154 travel upwardly, opposite to the direction of arrow 157, thereby causing the lower edges 160 of the vertical members 145 and 146 to move outwardly. As the bolt continues to tighten, the vertical members 145 and 146 press tightly against the interior walls 161 of the rear support member 18, thereby forming a rigid bond between the rear support member 18 and the fastener 142.

Referring to FIGS. 2, 5, 23, 24 and 25, a shelf 162 is seen which can span the distance between adjacent dividers 4 and 5, for example. The shelf 162 is formed of a series of parallel 0.25-inch diameter parallel steel wires, such as wires 163, 164 and 165, for example. The center to center distance 166 between adjacent wires 163 and 164, for example, is nominally 1.5 inches. The width 167 between the outermost wires 163 and 168 is approximately 16.5 inches. Three longer parallel wires 169, 170 and 171 span the twenty-inch distance between the dividers. The wires are bent at region 200 (FIG. 23) to prevent the ends of shelves in adjacent dividers from interfering with each other.

Figure 26:
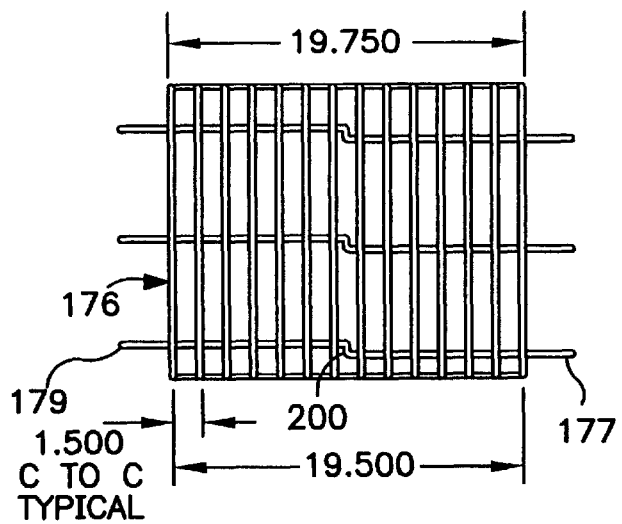
FIG. 26 illustrates a top view of a second embodiment of the shelf depicted in FIG. 5.
Figure 27:
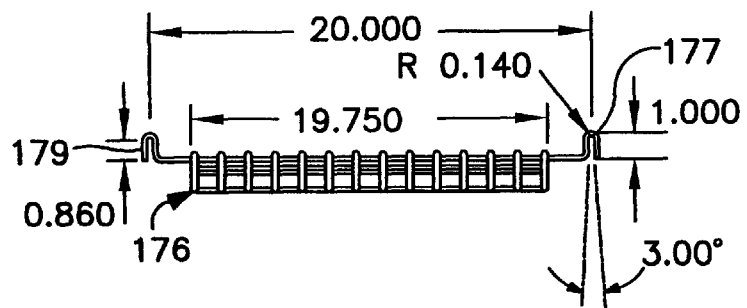
FIG. 27 illustrates a front view of the shelf depicted in FIG. 26.
Figure 28:
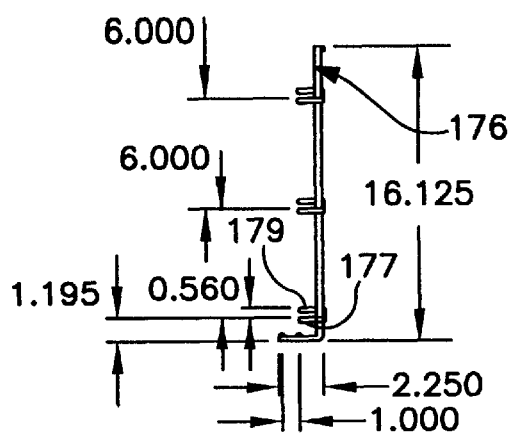
FIG. 28 illustrates a side elevation view of the shelf depicted in FIG. 26.

A series of hooks 172, 173, 178 and 174, for example, are formed at the ends of wires 169, 170 and 171. The hooks 172, etc., can be placed over parallel wires 175 (see FIG. 6), for example, that form the divider 4. The shelf 162 is intended for use in conjunction with the top rail 10. When the top rail 103 is used, the shelf 176 depicted in FIGS. 26, 27 and 28 is used. The dimensions and manner of construction of shelf 176 are substantially identical to those of shelf 162, except that the distance 180 between opposite hooks 177 and 179 is approximately twenty-four inches. Another accessory used in constructing modular storage system 1 is hangar or hook 13, best seen in FIGS. 1, 5, 31 and 32. The hook 13 is formed of six-gauge wire having a diameter of 0.192 inch. Hook 13 has a bent portion 181 which may be hung from the parallel wires 82, 83, etc. of back wall grid 80 (FIG. 9). An upper support 182 extends outwardly from a vertical support 183 for a distance 184 of approximately two inches. The angle 185 between the vertical support 183 and the upper support 182 is approximately ninety three degrees. A tip region 186 is integrally formed with the upper support 182, having a length 187 of approximately 0.436 inch. The tip region 186 is inclined upwardly with respect to upper support 182 at an angle 188 of approximately twenty-three degrees. A lower support 189 extends outwardly from the curved lower end 190 of vertical support 183. The lower support 189 has a length 191 of 1.907 inches, and includes a tip region 192 substantially identical to the tip region 186. The tip region 192 is displaced behind tip region 186 partly because lower support 189 is approximately 0.1 inch shorter than the upper support 182, and also because lower end 190 curves rearwardly a distance of approximately 0.25 inch.

Installation of the present system is straightforward. For an installation on a wooden wall, the type of fastener used is a ⅜" by 2" lag screw, while a ⅜" by 1⅞" sleeve type anchor bolt is used with a concrete wall. The tools required are a rubber mallet, 7/16", ½" and 9/16" sockets with ratchet, a ⅜" masonry bit or ¼" wood bit and drill, a chalk line and a tape measure.

The first step to locate a clean and level area on the floor for assembly and to lay the cardboard from the shipping carton down on the floor to protect the lockers as they are assembled. The next step is to identify top and bottom horizontal rails or connection tubes, two of the dividers, and one rear grid or back wall grid. Each horizontal rail includes several channels welded orthogonally to it, these forming part of the wedge tube fastening scheme described earlier. A hole in the horizontal rail is aligned with the longitudinal axis of the channel. A machine screw with flat washer is placed in the hole and then threaded onto the V-nut or spreader 154 which resides within the channel.

The tips 101 of the back wall grid 80 or rear grid 137 are then placed into the holes in the rear support member of the first divider. One of the inserts 117 is inserted into the rear support member 18. The second divider is then held upright, the next insert of the top rail is placed into its rear support member and the tips 101 are inserted into the mating holes of the rear support member. Rear grids or back wall grids and dividers are added until the desired number of lockers is achieved. The inserts of the bottom rail are then inserted into the bottoms of the rear support members, the rubber mallet being used as needed.

The machine screws in the inserts or wedge tube fasteners are then tightened with the 7/16" socket until the V-nut or spreader 154 is pressed securely against the wall of the channel 156. The lockers are now ready to be mounted on a wall.

A chalk line should be placed on the wall 6½" from the floor. Determine the location of the end of the first locker, and measure either 20 inches or 24 inches from that point, depending on locker width, continuing to mark such a distance until the end of the locker assembly's total width is reached. These marks indicate the location of the dividers. Ideally, mounting holes should not be drilled within 1½" of these marks.

The mounting brackets 51, 52, etc. should be placed approximately every 32" along the chalk line. In wood wall construction, the lag screws must be fastened into wooden studs. In concrete block wall construction, anchor bolts must be placed in the web (nonhollow) area for maximum strength. Drill either a ¼" diameter hole for wood construction or a ⅜" diameter hole for concrete construction at the points marked along the chalk line. Attach the lower brackets into the holes drilled into the chalk line and tighten the fasteners just enough to keep the lower vertical portion 57 upright. Lift the assembled lockers into the lower line of brackets and press the lockers against the wall. Position the upper set of mounting brackets 59, 61, etc. along the top support rail and mark the locations on the wall where the mounting holes must be drilled. After removing the upper brackets and drilling the marked holes, the upper brackets may be mounted and all fasteners for both the top and bottom brackets may be finally tightened.

Various modifications can be made to the present invention without departing from the apparent scope hereof.

MODULAR VENTILATED STORAGE SYSTEM
PARTS LIST

| | | | |
|---|---|---|---|
| 1 | modular storage system | 20 | hole |
| 2 | wheeled base | 21 | hole |
| | | 22 | hole |
| 3 | back wall | | |
| | | 23 | sidewall (of 18) |
| 4 | divider | | |
| 5 | divider | 24 | wire |
| | | 25 | wire |
| 6 | bottom shelf | 26 | wire |
| 7 | top shelf | 27 | perimeter tube (of 4, 5) |
| 8 | enclosed storage region | 28 | center to center spacing |
| 9 | unenclosed storage region | | (page 9, line 12) |
| | | 29 | width (of 18) |
| 10 | top rail | | |
| | | 30 | end (of 27) |
| 11 | opening | 31 | end (of 27) |
| 12 | opening | | |
| | | 32 | distance (page 10, line 8) |
| 13 | hook or hanger (page 17, line 13) | | |
| | | 33 | straight portion (of 27) |
| 14 | name plate or label | | |
| 15 | [wire mesh] grid | 34 | wire (of 15) |
| 16 | wire | 35 | corner (of 27) |
| 17 | wire | 36 | corner (of 27) |
| 18 | rear support member (of dividers 4 & 5) | 37 | radius |
| | | 38 | longitudinal axis |
| 19 | length (of 18) | | |
| | | 39 | end wall |
| | | 40 | end wall |
| 41 | perimeter tube (of 39) | | |
| | | 67 | insert |
| 42 | hole | 68 | insert |
| 43 | hole | 69 | insert |
| 44 | hole | 70 | insert |
| 45 | lockers (FIG. 2) | 71 | outer wall (of 67) |
| 46 | end wall | 72 | end (of 10) |
| 47 | bottom rail | 73 | distance (72 to 71) |
| 48 | rear support member (of end walls 39, 40, 46) (page 10, line 28) | 74 | outer wall (of 68) |
| | | 75 | distance (71 to 74) |
| | | 76 | distance (74 to 77) |
| 49 | wheeled base | 77 | outer wall (of 69) |
| | | 78 | outer wall (of 70) |
| 50 | wall | | |
| | | 79 | distance (77 to 78) |
| 51 | bottom bracket | | |
| 52 | bottom bracket | 80 | back wall grid |
| 53 | bottom bracket | | |
| 54 | bottom bracket | 81 | wire |
| | | 82 | wire |
| 55 | upper vertical portion | 83 | wire |
| 56 | horizontal portion | 84 | spacing (of wires 81, 82, 83) |
| 57 | lower vertical portion | | |
| | | 85 | length (of 80) |
| 60 | mounting hole | | |
| | | 86 | first end wire (of 80) |
| 59 | top bracket | | |
| 61 | top bracket | 87 | distance |
| 62 | top bracket | | |
| 63 | top bracket | 88 | second end wire (of 80) |
| 65 | length (of 10) | | |
| 65 | width (of 10) | 89 | distance |

-continued

MODULAR VENTILATED STORAGE SYSTEM
PARTS LIST

| | | | |
|---|---|---|---|
| 66 | bottom surface (of 10) | 91 | outer side wire (of 80) |
| | | 92 | outer side wire (of 80) |
| | | 121 | length |
| 93 | distance | | |
| | | 122 | second end (of 113) |
| 94 | wire (of 80) | | |
| 95 | wire (of 80) | 123 | tube |
| 96 | hole (FIG. 6 and page 13, lines 11, 21) | 124 | outside diameter (of 123) |
| 97 | wire (FIG. 9) | 125 | distance |
| 98 | wire (FIG. 9) | | |
| 99 | wire (FIG. 9) | 126 | edge |
| 100 | distance | 127 | tubing |
| 101 | tip (of wire 97) | 128 | length (of 127) |
| 102 | center to center width | 129 | (longer) extender rail |
| 103 | (longer) top rail | 130 | square tube |
| 104 | distance | 131 | round insert |
| 105 | insert | 132 | insert |
| 106 | insert | 133 | insert |
| 107 | insert | 134 | insert |
| 108 | insert | | |
| | | 135 | distance |
| 109 | length | | |
| | | 136 | length (of 129) |
| 110 | storage region | | |
| 111 | storage region | 137 | rear grid |
| 112 | | 138 | center to center width |
| 113 | extender rail | 139 | outer wire |
| 114 | width (of 113) | 140 | wire |
| 115 | insert | 141 | distance |
| 116 | insert | | |
| 117 | insert | 142 | (wedge tube) fastener |
| 118 | interval | 143 | horizontal member |
| 119 | interval | | |
| | | 144 | interior passageway |
| 120 | first end (of 113) | | |
| 145 | first vertical member | 168 | wire |
| 146 | second vertical member | 169 | wire |
| | | 170 | wire |
| 147 | interior region | 171 | wire |
| 148 | bolt | 172 | hook |
| | | 173 | hook |
| 149 | (bolt) head | 174 | hook |
| 150 | washer | 175 | wire (FIG. 6) |
| 151 | upper surface (of 143) | 176 | shelf |
| 152 | wedge assembly | 177 | hook |
| | | 178 | hook |
| 153 | threaded base plate | 179 | hook |
| 154 | spreader or V-nut (page 18, line 20) | 180 | distance |
| | | 181 | bent portion |
| 155 | hole (in 154) | | |
| | | 182 | upper support |
| 156 | channel | | |
| | | 183 | vertical support |
| 157 | arrow | | |
| 158 | arrow | 184 | distance |
| 159 | lower edges (of 154) | 185 | angle |
| 160 | lower edges (of 145, 146) | 186 | tip region |
| | | 187 | length |
| 161 | interior walls (of 18) | | |
| | | 188 | angle |
| 162 | shelf | | |
| | | 189 | lower support |
| 163 | wire | | |
| 164 | wire | 190 | curved lower end |
| 165 | wire | | |
| | | 191 | length (of 189) |
| 166 | center to center distance | | |
| | | 192 | tip region |
| 167 | width | 200 | region (FIGS. 23 & 26) (page 16, line 29) |

I claim:

1. A modular ventilated storage system, comprising:

a. a back wall, said back wall being in the form of a wire grid having a front side and a rear side;

b. two end walls, each end wall being in the form of a wire grid surrounded by a frame including a rear support member which extends along a rear edge of the wire grid and a perimeter member which extends along all other edges of the wire grid and is joined to the rear support member, the rear support member of each end wall having an open top end and an open bottom end;

c. at least one divider wall, each divider wall being in the form of a wire grid surrounded by a frame including a rear support member which extends along a rear edge of the wire grid and a perimeter member which extends along all other edges of the wire grid and is joined to the rear support member, the rear support member of each divider wall having an open top end and an open bottom end;

d. a top rail, said top rail being in the form of a linear member having a plurality of elongated inserts spaced along its length and protruding downwardly therefrom;

e. a bottom rail, said bottom rail being in the form of a linear member having a plurality of elongated inserts spaced along its length and protruding upwardly therefrom;

f. said end walls and each divider wall extending orthogonally to said front side of said back wall, and said back wall being attached to said rear support members of said end walls and each divider wall;

g. said top rail extending transversely to said end walls and each divider wall above said end walls and each divider wall with said elongated downwardly protruding inserts entering into the open top ends of said rear support members of said end walls and each divider wall; and, h. said bottom rail extending transversely to said end walls and each divider wall below said end walls and each divider wall with said elongated upwardly protruding inserts entering into the open bottom ends of said rear support members of said end walls and each divider wall.

2. The modular ventilated storage system as defined in claim 1, wherein said two end walls are identical and each divider wall is identical to the two end walls.

3. The modular ventilated storage system as defined in claim 1, wherein two additional end walls extend orthogonally to said rear side of said back wall in line with the two end walls extending orthogonally to the front side of said back wall, and wherein additional divider walls equal in number to the number of divider walls extending orthogonally to the front side of said back wall extend orthogonally to said rear side of said back wall in line with each divider wall extending orthogonally to the front side of said back wall.

4. The modular ventilated storage system as defined in claim 3, wherein the rear support member of each end wall serves also as a rear support member of the aligned additional end wall, and wherein the rear support member of each divider wall serves also as a rear support member of the aligned additional divider wall.

5. The modular ventilated storage system as defined in claim 3, and further including a wheeled based.

6. The modular ventilated storage system as defined in claim 1, wherein said back wall is composed of sections each having a width spanning adjacent rear support members.

7. The modular ventilated storage system as defined in claim 1, and further including bottom shelves fastened to the wire grids of the end walls and each divider wall at lower regions thereof, each bottom shelf being formed of a wire grid.

8. The modular ventilated storage system as defined in claim 7, and further including top shelves fastened to the wire grids of the end walls and each divider wall at upper regions thereof, each top shelf being formed of a wire grid.

9. The modular ventilated storage system as defined in claim 1, and further including a plurality of top brackets and a plurality of bottom brackets for securing said top and bottom rails, respectively, to a wall.

* * * * *